United States Patent [19]
Anfuso et al.

[11] Patent Number: 5,308,878
[45] Date of Patent: May 3, 1994

[54] PROCESS FOR PRODUCING FOAMABLE PARTICLES OF STYRENIC POLYMERS, HAVING IMPROVED PROCESSABILITY AND MECHANICAL PROPERTIES

[75] Inventors: Francesco Anfuso; Roberto Lanfredi; Gianfranco Veroli, all of Mantova; Italo Borghi, Ferrara, all of Italy

[73] Assignee: Enichem S.p.A., Milan, Italy

[21] Appl. No.: 888,616

[22] Filed: May 27, 1992

[30] Foreign Application Priority Data

May 31, 1991 [IT] Italy ............................ MI91A001502

[51] Int. Cl.$^5$ ................................................ C08G 9/18
[52] U.S. Cl. ........................................... 521/56; 521/60
[58] Field of Search ...................................... 521/56, 60

[56] References Cited

U.S. PATENT DOCUMENTS

| | | | |
|---|---|---|---|
| 2,983,692 | 5/1961 | D'Alelio | 521/60 |
| 4,169,193 | 9/1979 | Biglione et al. | 521/56 |
| 4,172,928 | 10/1979 | Alvares et al. | 521/58 |
| 4,200,696 | 4/1980 | Biglione et al. | 521/58 |
| 4,226,942 | 10/1980 | Wei . | |
| 4,599,366 | 7/1986 | Kesling, Jr. et al. . | |

FOREIGN PATENT DOCUMENTS 2552299  6/1977  Fed. Rep. of Germany .

OTHER PUBLICATIONS

World Patents Index Latest, Week 911, Derwent Publications, Ltd. London, GB; An 90:080358 & JP-A-2 034 641 (Kanegafuchi Chem. K.K.) Feb. 5, 1990, (Abstract).
World Patent Index Latest, Week 9001, Derwent Publications Ltd. London, GB; AN 90:005279 & JP-A-1 289 841 (Kanegafuchi Chem. K.K.) Nov. 21, 1989, (Abstract).
World Patent Index Latest, Week 8044, Sep. 18, 1980, Derwent Publications Ltd., London, GB; AN 80:77934C & JP-A-55 120 636 (Denki Kagaku Kogyo Co.) Sep. 18, 1980, (Abstract).
Encyclopedia of Polymer Science & Technology (1985), vol. 2, p. 534.
Encyclopedia of Modern Plastics, Oct. 1991, (1992) pp. 92, 93 and 256.

Primary Examiner—John Kight, III
Assistant Examiner—T. Mosley
Attorney, Agent, or Firm—Oblon, Spivak, McClelland, Maier & Neustadt

[57] ABSTRACT

Process for producing foamable particles of styrenic polymers, which consists in submitting said particles to a partial loss of foaming agent, performed in an oven at a lower temperature than the glass transition temperature (Tg) of said particles.

16 Claims, No Drawings

PROCESS FOR PRODUCING FOAMABLE PARTICLES OF STYRENIC POLYMERS, HAVING IMPROVED PROCESSABILITY AND MECHANICAL PROPERTIES

FIELD OF THE INVENTION

The present invention relates to a process for producing foamable particles of styrenic polymers, having improved processability characteristics and mechanical characteristics.

More particularly, the present invention relates to a process for producing foamable particles of styrenic polymers, which are particularly suitable for producing, by moulding, finished articles and blocks with an extremely good surface appearance, low shrinkages, a high sinterization degree, and with a relatively short residence time inside the mould.

BACKGROUND OF THE INVENTION

The production of foamable particles of styrenic polymers, in particular polystyrene, is well-known in the art. It consists in incorporating into the polymer, during the polymerization step, or at a later time, a foaming agent boiling at a lower temperature than the polymer softening temperature.

When the particles which contain the foaming agent are heated, the foaming agent evaporates and generates a very large number of closed hollows, viz., cells, in the polymer.

In order to produce low-density finished articles or blocks, these particles are charged into the hollow of a mould which defines the shape of the desired finished article, and are then heated up to a higher temperature than the boiling point of the foaming agent, and than the softening point of the polymeric material. During this heating stage. the particles are foamed and, owing to the limited available room, get sintered, forming a body having the shape, and the dimensions, of the hollow of the mould used.

The particles can be directly charged to the mould, or they can be pre-formed and, before being charged to the mould, they may be submitted to ageing, for time periods of approximately 15–30 hours.

After the moulding, the resulting shaped article is allowed to cool inside the mould for a period of time long enough to prevent the moulded article from undergoing deformations after being de-moulded.

Inasmuch as the foamed plastic material is a very good heat insulator, in order to cool the formed body, relatively long residence times inside the mould are required.

Therefore, the cooling time represents a large portion of the moulding cycle and enormously reduces the mould throughput during a given time period.

In order to reduce the residence time inside the mould, and simultaneously obtain a good sinterization outcome, in the past the addition was proposed of small amounts of halogenated organic compounds, such as bromo-, chloro- or chloro-bromo-derivatives, to be added to the styrenic polymer at polymerization time.

Some examples of these organic compounds, added to styrene during the polymerization step, are reported in U.S. Pat. Nos. 4,169,193; 4,172,928; and 4,200,696.

These organic products make it possible the residence time inside the mould to be reduced to an even considerable extent, but suffer from several drawbacks which limit the use thereof. A first drawback is due to the development of unpleasant smells during the pre-foaming step. Furthermore, after the moulding high shrinkage rates are observed, consequently moulded bodies with pre-established dimensions cannot be obtained.

Furthermore, the use of halogenated organic products may cause toxicity problems when the material is used in food packaging applications. As well-known, the various national Law regulations suggest that halogenated products should be eliminated from the formulations of foamable polystyrenes.

In European patent publication No. 0 046 494, coating the particles of styrenic polymers with a hydroxycarboxy acid ester or a carboxy acid ester of an alkoxy alcohol is proposed. Such a coating imparts to the material very short moulding times, and very good sintering ability; unfortunately, it displays the drawback that large amounts of additives have to be added to the particles in order to have acceptable results, with consequent problems of caking of the particles inside the containers, and of pollution of process water during the moulding operation.

SUMMARY OF THE INVENTION

The present Applicant found now that foamable particles of styrenic polymers, suitable for obtaining moulded articles which do not display the above cited drawbacks, can be obtained by submitting said particles, containing, incorporated, from 2 to 20% of foaming agent, to a partial loss of foaming agent, carried out, before the pre-foaming, at a lower temperature than the glass transition temperature of the particles.

DETAILED DESCRIPTION OF THE INVENTION

Therefore, the subject-matter of the present invention is a process for producing foamable particles of styrenic polymers, suitable for producing, by moulding. shaped articles and blocks with an extremely good surface appearance, low shrinkage ratios, and with a relatively short residence time inside the mould, which process consists of:

producing the foamable particles of styrenic polymers, containing, incorporated from 2 to 20% by weight of a foaming agent;

coating said particles with an antistatic agent, in an amount of not more than 1% by weight;

removing a portion of said incorporated foaming agent, at a lower temperature than the particles' glass transition temperature.

The amount of foaming agent which is removed from the foamable particles is not critical for the purposes of the present invention; however, the best results, in particular as regards the sintering degree, are obtained when the foaming agent loss is not larger than 60% by weight, and preferably is comprised within the range of between 5 and 50weight, relatively to the initial content of said foaming agent.

The removal of foaming agent is preferably carried out by heating, preferably in an oven, at lower temperatures than the glass transition temperature (Tg) of the particles.

The residence time of the particles inside the oven varies as a function of temperature, and of the amount of foaming agent to be removed. In general, the temperature is comprised within the range of between 25° and 60° preferably of from 35° to 50° C., and the residence time is within the range of between 10 minutes and 24 hours.

The particles containing, incorporated, the foaming agent, can be produced by carrying out the polymerization—preferably in aqueous suspension—of styrene, either alone or in mixture with one or more ethylenically unsaturated comonomer(s) copolymerizable with it—in the presence of a foaming agent.

The polymerization can be carried out in the presence of at least one peroxy initiator, or by thermal means according to any conventional process, well known from the prior art.

According to an alternative route, the foaming agent can be incorporated in the previously produced styrenic polymer, by exposing the particles of said polymer to the vapour of the foaming agent, or adding the latter to the already produced particles, suspended in water, or during an extrusion step. The various methods for producing foamable particles are well-known to those skilled in the art, and are described in technical literature. For exemplifying purposes, G.B. patents Nos. 695,826; 715,100; 886,811; 908,089; 1,048,243; and U.S. Pat. No. 2,983,692; are cited the contents of which are incorporated by reference herein.

The expressions "styrene polymers" or "styrenic polymers", as used in the instant disclosure and in the appended claims, encompass both styrene homopolymers, and styrene copolymers with other vinylic and/or vinylidenic monomers, which copolymers contain at least 50% by weight of chemically combined styrene.

Examples of such comonomers are $\alpha$-methylstyrene; arhalogenated styrene, such as 2,4-dichlorostyrene; acrylonitrile; methacrylonitrile; esters of $\alpha,\beta$-unsaturated carboxy acids with $C_1$-$C_8$ alcohols, such as esters of and/or methacrylic acid; N-vinyl-compounds, such as vinylcarbazole, and so forth.

Within the expressions "styrene polymers" or "styrenic polymers", also those copolymers are encompassed which, besides styrene, and possibly the above mentioned vinylic and/or vinylidenic comonomers, also contain small amounts of monomers which contain two double bonds of vinylic type, such as, e.g., divinylbenzene.

The foamable polystyrene particles contain, as foaming agents, the conventional easily volatile organic compounds, which may be in gas or liquid form at room temperature, and do not dissolve the polymer, but cause it to foam, and the boiling point of which is lower than polymer's softening point.

Examples of particularly suitably foaming agents are the aliphatic hydrocarbons of from 2 to 6 carbon atoms, such as propane, butane, n-pentane, isopentane, hexane, cyclohexane, and so forth, which may be used either as single compounds, or as mixtures thereof; petroleum ether; and the halogenated derivatives of $C_1$-$C_3$ aliphatic hydrocarbons, such as the several chloro- and fluoro-derivatives of methane, ethane and ethylene, such as dichloro-di-fluoro-methane, 1,2,2-trifluoro-ethane, 1,1,2-trichloro-ethane, and so forth.

The foaming agent is generally used in an amount of between 2 and 20%, and preferably comprised within the range between 4 and 10%, by weight, relatively to the weight of polymer.

The antistatic agents used in the process according to the present invention are those, the use of which is generally proposed in order to improve the surface properties of free-flowing capability, finishing and processability of particles of styrenic polymers.

These antistatic agents are well-known and are described in technical literature; for exemplifying purposes, K. Johnson, Antistatic Compositions for Textiles and Plastics, Noyes Data Corporation, Park Ridge, N.J. 1976, may be mentioned herein.

Examples of antistatic agents which can be used in the process according to the present invention comprise: fatty acid esters, such as, e.g., butyl stearate; mono-hydroxy or poly-hydroxy alcohols, such as, e.g., glycerol; amines, such as, e.g., an ethoxylated tertiary alkylamine, a fatty acid dialkanolamine; amides, such as, e.g., N,N-bis-(2-hydroxyethylstearamide); polyoxyethylenic or polyoxyalkylenic derivatives, such as, e.g., a polyethylene glycol hexadecyl ether; ethylene oxide/propylene oxide copolymers; aminic soaps, such as, e.g., the stearic acid salt of octadecylamine; aminic salts of alkyl-sulfates; such as, e.g., the octadecylsulfate salt of guanidine; quaternary ammonium compounds, such as, e.g., octadecyl-trimethylammonium chloride; alkyl-phosphates, such as, e.g., bisdodecyl hydrogen phosphate; and aminic salts of alkylphosphonic acids, such as, e.g., the octadecyl-phosphonic acid salt of triethanolamine, and so forth.

These antistatic agents can be used either as individual compounds, or as mixtures of any of them, in any ratios.

The preferred antistatic agents for use in the process according to the present invention are: the block ethylene oxide/propylene oxide block copolymers with a content of ethylene oxide comprised within the range of from 10 to 50% by weight and a molecular weight comprised within the range of from 1000 to 5000, known in the market under the trade name GLENDION ®; or an ethoxylated tertiary alkyl amine known in the market under the trade name ATMER ®, by I.C.I.

The amount of antistatic agent generally is of not more than 1% relatively to the polymer, e.g., is comprised within the range of between 0.001 and 0.5% and preferably between 0.010 and 0.1% by weight, with respect to the polymer.

The polymer particles can be coated with the antistatic agent out by any mixing methods, as known from the prior art; for example, the foamable particles can be treated with the proper amount of antistatic agent in a revolving drum, or in a tumbler.

Coating the particles with the antistatic agent facilitates the subsequent sieving operation, which thus enables various fractions to be obtained, each of which has a controlled size range, and is destined to different uses.

Before being fed to the moulding step, the particles are generally submitted to a pre-foaming stage by steam or hot air, at higher temperatures than particles' glass transition temperature, and then to an ageing at room temperature, for a time comprised within the range of between 10 and 30 hours, according to techniques known from the art.

The foamable particles obtained by means of the process according to the instant invention display the following characteristics:

(a) a short residence time inside the mould, generally equal to, and even lower than, 50% of the necessary time for cooling the blocks or shaped articles prepared from pre-foamed particles not treated according to the process of the present invention;

(b) a deformation of the block, in thickness direction, of $\leq 1\%$;

(c) a high sinterization degree, so as to allow the moulding to be carried out with the addition of substantial amounts of recycled scrapped foamed products;
(d) short ageing times after pre-foaming; and
(e) a high absorbing power for pigments, or other additives, on their surface.

Besides the foaming agents, styrene polymers can also contain further additives, such as, e.g., flame retardants, organic and inorganic fillers, dyes, pigments, antistatic agents, anti-caking agents to prevent clumps from being formed during the pre-foaming step, plasticizers and other analogous compounds.

The polymerization of styrene, preferably in aqueous suspension, the addition of the foaming agent, preferably during the course of the polymerization and the transformation of the particles into shaped articles by moulding inside closed moulds, are accomplished by means of techniques which are well-known to those skilled in the art, and are widely described in technical literature such as, e.g., in "Rigid Plastic Foams" by T. N. Ferrigno, Reinhold Publishing Corp., New York, U.S.A. (1963).

DESCRIPTION OF THE PREFERRED EMBODIMENTS

The following examples are reported for the purpose of better illustrating the essential features of the present invention and in no way are to be construed as being limitative of the invention.

EXAMPLE 1

20 kg of particles of a polystyrene having a weight average molecular weight of 180,000, a size comprised within the range of between 0.2 and 2.7 mm, and containing, incorporated, a foaming agent constituted by a mixture of n-pentane and iso-pentane in the ratio of 70:30 by weight, were obtained by polymerizing styrene in aqueous suspension, at a temperature comprised within the range of from 85° to 120° C., and in the presence of dibenzoyl peroxide and ter.-butyl peroxide as catalysts.

The particles discharged from the polymerization reactor were washed with water, centrifuged and dried at 20° C. for 1

The foamable particles were admixed with 300 ppm of an antistatic agent constituted by a block copolymer of ethylene oxide and propylene oxide in the ratio of 10:90 by weight, and having a molecular weight comprised within the range of from 2,000 to 3,000, known on the market under the trade name GLENDION FG.

The admixing was performed in a tumbler, at room temperature, for a time of approximately 10 minutes. The particles were then sieved and two fractions thereof were separated, of which the fraction (A) is constituted by particles having a diameter comprised within the range of between 0.4 and 0.9 mm, and the other fraction (B) is constituted by particles having a diameter comprised within the range of between 0.9 and 2.7 mm.

The content of foaming agent, as measured on each fraction, was of 6.8% by weight in fraction (A), and of 6.9% in fraction (B).

Each fraction was then subdivided into two equal portions, i.e., "A.1" and "A.2"; and "B.1" and "B.2", respectively.

The fraction A.2 was charged into an oven, heated up to about 35° C. and the content of foaming agent in it was measured at time intervals of 10 minutes. When the foaming agent content reached the value of 5% by weight, the sample was removed from the oven and was rapidly cooled, in order to stop the loss of foaming agent.

Each fraction A.1 and A.2 was admixed with a conventional coating blend consisting of 0.2% by weight, relatively to the weight of the polymer, of glyceryl monostearate and 0.05% by weight of zinc stearate, and then was pre-foamed with steam at 95°-100° C., to a density 25 g/l. Each fraction was allowed to age in air, at room temperature for 24 hours and subsequently was moulded in order to transform it into packaging containers of 40 cm×60 cm and 2 cm of thickness. The moulding was carried out with steam at 0.9 Ate. The cooling time of the containers, defined as the time of residence inside the mould necessary in order that each shaped article can retain the dimensions of the mould after being extracted from the same mould, was measured.

The containers obtained from fraction A.2 showed a cooling time (2 minutes 45 seconds), which was approximately 50% shorter than the cooling time of containers obtained from fraction A.1 (5 minutes).

On each container, the sintering degree, defined as the percentage of foamed particles which were broken following the breakage of the bottom of the container, was determined.

The sinterization percentage is determined by defining a breakage section of approximately 10 cm$^2$ of surface area, counting the total number of foamed particles contained in that section and calculating the number of broken particles, as referred to the total number of particles.

By means of this measurement, it was found that the containers from fraction A.2 had a sinterization degree of 80%, whilst those from fraction A.1 had a sinterization degree of 15%.

The fraction B.2 was treated as disclosed for fraction A.2. When the content of foaming agent was of 5.1%, the sample was removed from the oven, and rapidly cooled in order to stop the loss of foaming agent.

Each fraction B.1 and B.2 was admixed with the same coating agent used in fractions A.1 and A.2, was pre-foamed to a density of about 20 g/l, and was allowed to age, at room temperature, for 24 hours, as previously done for fractions A.1 and A.2.

Each fraction was subsequently moulded in order to obtain blocks of 100 cm×100 cm×50 cm. The was carried out by steam at 0.65 Ate.

The time of residence (9 minutes) inside the mould, of the block obtained from fraction B.2 was 55% shorter the residence time (20 minutes) of the block obtained from fraction B.1.

The deformations measured on the thickness of the block from fraction B.2 were 75% lower than those of the block from fraction (5 mm vs. 20 mm).

The sinterization degree of a sheet of 5 cm of thickness, cut from the block from fraction B.2, resulted to be considerably higher than of the corresponding sheet, having the same thickness, cut from the block from fraction B.1 (50% vs. 5%).

From the blocks, sheets were cut which had a thickness of 1.5 mm. When they were examined against a dark background, the sheets from the block from fraction B.2 showed a complete absence of crevices between the sintered particles, which were observed, on the contrary, in the sheet from the block obtained from fraction cut B.1.

EXAMPLE 2

Both fractions A.1 and A.2 of Example 1 were under the same operating conditions of Example 1, except for the ageing time, which was of only 5 hours.

The residence time inside the mould of the container obtained from fraction A.1 was longer than 10 minutes and the containers, after being removed from the mould, were very much deformed. The residence time inside the mould shown by the container obtained from fraction A.2 was only 20% longer than of Example 1, which had been allowed to age for 24 hours; furthermore, the de-moulded containers were not deformed.

EXAMPLE 3

The fractions B.1 and B.2 obtained in Example 1, a 24-hours ageing, were admixed with 25% by weight of foamed polystyrene recovered from waste material, obtained by grinding scrapped articles.

Each fraction was moulded under the same conditions of Example 1.

The sinterization degree of the block from fraction B.2 was considerably higher than of the block from fraction B.1 (40% vs. 0%).

Furthermore, when it was visually examined against a dark background, a sheet of 1.5 mm of thickness, cut by hot wire from the block from fraction B.2, showed a substantial absence of crevices between the sintered particles.

A similar sheet obtained by cutting from the block obtained from fraction B.1 resulted to be uneven, with large-size crevices and quite evident deposits of condensate water.

EXAMPLE 4

By operating according to the same procedure shown in Example 1, two samples "C.1" and "C.2" prepared, which had the same characteristics of samples A.1 and A.2 Example 1, respectively.

Each sample was admixed with 0.1% by weight of carbon black, and then with a conventional moulding coating constituted by 0.2% by weight, relatively to the polymer, of glyceryl monostearate and 0.05% of zinc stearate.

The mixing was carried out in a tumbler, at room temperature.

Each sample was then pre-foamed, allowed to age and moulded under the same operating conditions of Example 1.

Sample C.2 had a uniformly pigmented surface with no release of carbon black; on the contrary, C.1 sample had an uneven carbon black distribution, and underwent a pigment loss over time.

Furthermore, the sinterization degree of the article obtained from sample C.2 resulted to be considerably higher than of article from C.1 (25% vs. 0%).

We claim:

1. A process for producing foamable particles of styrenic polymers having improved processability and mechanical characteristics, said process consisting in
   (i) coating said styrenic polymer particles, containing therein from 2 to 20% by weight of a foaming agent, with an antistatic agent in an amount of not more than 1% by weight based on the polymer particles; and
   (ii) partially removing from said styrenic polymer particles not more than 60% by weight of the foaming agent, before the pre-forming, by treatment in oven and at a temperature lower than the glass transition temperature of said particles.

2. The process according to claim 1, wherein by the partial removal 5 to 50% wt. of foaming agent is removed the styrenic polymer particles.

3. The process according to any one of claims 1 and 2, wherein the foaming agent is partially removed at a temperature of 25° to 60° C. in 10 minutes 25 hours.

4. The process according to claim 3, wherein the foaming agent is partially removed at a temperature of 35° to 50° C.

5. The process according to any one of claims 1 and 2, wherein the foaming agent is a $C_2$–$C_6$-aliphatic petroleum ether, a halogenated $C_1$–$C_3$-aliphatic mixture thereof.

6. The process according to claim 5, wherein the $C_2$–$C_6$-aliphatic hydrocarbon is propane, butane, n-pentane, isopentane, hexane or cyclohexane.

7. The process according to claim 5, wherein the halogenated $C_1$–$C_3$-aliphatic hydrocarbon is a chlorofluoro-substituted methane or ethane.

8. The process according to any one of claims 1 and 2, wherein the styrenic polymer particles before partially removing the foaming agent contain 4–10% wt. of foaming agent.

9. The process according to claim 1, wherein the antistatic agent is a fatty acid ester, a monohydroxy alcohol, a polyhydroxy alcohol, an amine, an amide, a polyoxyalkylenic compound, an aminic soap, an aminic salt of an alkyl-sulfate, a quaternary ammonium compound, an alkyl phosphate, an aminic salt of an alkylphosphonic acid, or a mixture thereof.

10. The process according to claim 9, wherein the antistatic agent is butyl stearate, glycerol, an ethoxylated tertiary alkylamine, a fatty acid dialkanolamine, N,N-bis-(2-hydroxyethylstearamide), a polyethylene glycol hexadecyl ether, an ethylene oxide/propylene oxide copolymer, the stearic acid salt of octadecylamine, the octadecylsulfate salt of guanidine, octadecyltrimethyl-ammonium chloride, bis-dodecyl hydrogen phosphate, the octadecyl-phosphonic acid salt of triethanolamine or a mixture thereof.

11. The process according to claim 9, wherein the antistatic agent is an ethylene oxide/propylene oxide copolymer having an ethylene oxide content of 10–50% wt.

12. The process according to claim 9, wherein the antistatic agent is an ethoxylated tertiary alkylamine.

13. The process according to claim 1, wherein the amount of antistatic agent is 0.001–0.5% wt.

14. The process according to claim 1, wherein the amount of antistatic agent is 0.01–0.1% wt.

15. The process according to any one of claims 1 and 2, wherein the styrenic polymer particles are sieved before partially removing the foaming agent therefrom.

16. Foamable styrenic polymer particles obtained by the process of any one of claims 1 and 2.

* * * * *